United States Patent [19]

Murphy

[11] 3,901,817
[45] Aug. 26, 1975

[54] HALOCARBON COMPOSITIONS
[75] Inventor: Kevin P. Murphy, Orchard Park, N.Y.
[73] Assignee: Allied Chemical Corporation, New York, N.Y.
[22] Filed: Apr. 22, 1974
[21] Appl. No.: 463,009

[52] U.S. Cl. ............... 252/67; 62/114; 252/68; 252/172; 252/305; 252/DIG. 9
[51] Int. Cl.² ............................................. C09K 5/04
[58] Field of Search .. 252/67, 68, 305, 172, DIG. 9; 62/114

[56] References Cited
UNITED STATES PATENTS

| | | |
|---|---|---|
| 1,968,050 | 7/1934 | Midgley, Jr. et al. ............... 252/67 |
| 2,534,789 | 12/1950 | Miller et al. ...................... 252/67 X |
| 3,640,869 | 2/1972 | Orfeo et al. ........................... 252/67 |
| 3,768,273 | 10/1973 | Missimer ........................... 62/114 X |

*Primary Examiner*—Ralph S. Kendall
*Assistant Examiner*—John D. Smith
*Attorney, Agent, or Firm*—Jay P. Friedenson; Jack B. Murray, Jr.

[57] ABSTRACT

Low boiling azeotropic and essentially azeotropic mixtures, consisting essentially of monochlorotrifluoromethane and methyl fluoride, useful as refrigerants.

7 Claims, No Drawings

HALOCARBON COMPOSITIONS

BACKGROUND OF THE INVENTION

1. Field of the Invention

This invention relates to low boiling azeotropic and essentially azeotropic mixtures consisting essentially of mono-chlorotrifluoromethane and methyl fluoride, which are especially adapted for use as high capacity, low temperature refrigeration compositions.

DESCRIPTION OF THE PRIOR ART

The lower aliphatic hydrocarbons when substituted by chlorine and fluorine are known to have potential as refrigerants. Many of these halocarbons exhibit certain desired properties including non-flammability and chemical inertness which have resulted in the extensive use of such compounds in a large number of refrigeration applications. Examples of such compounds include $CCl_2F_2$ (boiling poing $-21.6°F$.), $CHClF_2$ (boiling point $-41.4°F$.), $CHCl_2F$ (boiling point $48.1°F$.), $CCl_3F$ (boiling point $74.8°F$.), $CClF_2CClF_2$ (boiling point $38.4°F$.), $CHF_3$ (boiling point $-119.9°F$.) and $CClF_3$ (boiling point $-114.6°F$.).

While these halocarbons provide an adequate range of refrigerants for many purposes, only a very few exhibit sufficiently low boiling point to offer any significant potential as low temperature refrigerants.

It is well known that mixtures of substances which have different boiling points result in a range of mixture compositions having boiling points intermediate of the two components. On this basis it would be possible to mix two refrigerants having different boiling points and obtain a complete series of compositions boiling at temperatures between those of the components. However, it is known that such normal mixtures may exhibit fractionation with consequent reduction of evaporator pressure and loss of efficiency. The tendency to fractionate also makes handling and reclamation of the refrigerant mixtures difficult. Mixture compositions which are more desirable for use in refrigeration are those which are azeotropic and hence do not exhibit substantial fractionation during the refrigeration cycle or upon handling as is the case for ordinary mixtures. Thus, azeotropic mixtures, such as the $CHF_3/CClF_3$ azeotropic mixtures of U.S. Pat. No. 3,640,869 which possess a boiling point of approximately $-190°F$. at 14.65 psia, have been developed to achieve refrigeration temperatures lower than that of either component alone, and to avoid the fractionation difficulties which accompany the use of non-azeotropic mixtures of halocarbons.

To provide for flexibility in design, additional azeotropic mixtures useful as refrigerants are therefore desired. Unfortunately, as is well known in this field, there has not yet been found basis for predictability of the formation of azeotropes between any two compounds having a boiling point below the boiling point of either of the components contained therein. Specifically, there has not been found that closeness in structure of one halocarbon compound to another halocarbon compound which forms an azeotrope is of any aid at all in predicting the formation of a new azeotrope. There are literally thousands of possible combinations of halocarbons compounds which comprise mixtures having advantageous additive refrigeration properties but which are not azeotropic in nature.

SUMMARY OF THE INVENTION

In accordance with the invention, it has been discovered that monochlorotrifluoromethane ($CClF_3$) b.p. $-114.6°F$., and methyl fluoride ($CH_3F$), b.p. $-109°F$., in certain proportions, form an azeotropic mixture and essentially azeotropic mixtures, all of which boil at a temperature lower than the lower boiling $CClF_3$ component and which exhibit only negligible fractionation on boiling under refrigeration conditions.

The azeotropic mixtures of the present invention, having boiling points of approximately $-122.5°F$. or below, represent a marked reduction as compared with the boiling temperature of the lower boiling $CClF_3$ component ($-114.6°F$.). These compositions also provide substantially increased refrigeration capacity and represent new refrigerant compositions useful in obtaining high-capacity, low temperature refrigeration.

The azeotropic mixtures exhibit a number of desired properties for refrigeration purposes such as higher refrigeration capacity than either of the components, higher efficiency, negligible flammability, low toxicity and others. Moreover, the azeotropic mixtures of the present invention exhibit higher solubility of the refrigerant gas in refrigerant oils, as compared to monochlorotrifluoromethane alone, thereby producing better oil circulation, and also exhibit higher water solubility than that of monochlorotrifluoromethane alone.

A further unexpected property of the mixtures falling within the scope of the invention is that the compression ratios of said mixtures are lower than those of the individual mixture components alone. This has practicable significance in terms of higher volumetric efficiency of the compressor and longer compressor life.

DETAILED DESCRIPTION OF THE INVENTION

The true azeotropic mixture of the present invention consists of about 58 mole percent monochlorotrifluoromethane and about 42 mole percent methyl fluoride at atmospheric pressure (14.7 psia) and has a normal boiling point of $-122.5°F$. The true azeotropic composition will, of course, vary with the pressure. The essentially azeotropic mixtures possess boiling points and vapor pressures which are close to those of the true azeotropic mixture and which are lower and higher than the corresponding properties of either of the azeotropic components. It can be seen, therefore, that the essentially azeotropic mixtures behave similarly to the true azeotropic mixtures as refrigerants. Accordingly, the essentially azeotropic mixtures and true azeotropic mixtures are referred to herein generally as "the azeotropic mixtures."

A preferred class of the subject azeotropic mixtures are those which possess boiling points at atmospheric pressure (i.e. 14.7 psia.) which are within about $1.0°F$. of the boiling point of the true azeotropic mixture at this pressure. More preferred are mixtures which boil within $0.5°F$. of the true azeotrope at 14.7 psia. All of these mixtures boil below the boiling point of the $CClF_3$ component and exhibit little or no fractionation upon boiling. The true azeotropic mixture which contains about 58 mole percent $CClF_3$ at 14.7 psia. is the most preferred embodiment.

Table I shows the temperature-pressure relationship for the $CClF_3/CH_3F$ true azeotrope (about 58 percent $CClF_3$, about 42 percent $CH_3F$).

TABLE I

VAPOR PRESSURE OF
CClF$_3$/CH$_3$F TRUE AZEOTROPE

| Temperature, °F. | Pressure, psia. |
|---|---|
| −102.69 | 26.05 |
| −44.84 | 99.40 |
| 17.33 | 288.25 |
| 32.00 | 349.69 |
| 68.83 | 556.49 |

The azeotropic mixtures of the invention may be employed to produce refrigeration in a conventional manner by condensing the mixture and thereafter evaporating said mixture in the vicinity of a body to be cooled.

The azeotropic mixtures of the invention may also be used as aerosol propellants, gaseous dielectrics, heat transfer media, power cycle fluids and low temperature solvents.

Apart from the use of indicated amounts of monochlorotrifluoromethane and methyl fluoride, each of which may be prepared by known methods, make-up of a composition of the present invention requires no specific procedure. The CClF$_3$ and CH$_3$F employed should be substantially pure, preferably at least about 99% pure, and should contain no substances deleteriously affecting the boiling characteristics of the mixture compositions for their use as refrigerants.

The present invention may be further illustrated by reference to the following examples, wherein parts are by weight unless otherwise indicated.

EXAMPLE 1

A low temperature still operating at 14.7 psia. is charged with CClF$_3$ and set under reflux conditions. At the reflux conditions the head temperature of the still is −114.5°F. (−81.4°C.). A quantity of CH$_3$F is charged into the still which is then returned to reflux. The head temperature of the still is observed to drop to −122.5°F., which temperature is lower than either component, thereby indicating a minimum boiling azeotrope is formed. A fraction of the azeotrope is collected which is found to boil at −122.5°F. and which is found to contain both of these components, i.e. CClF$_3$ and CH$_3$F. Analysis by gas chromatography shows the composition to be about 58 mole percent CClF$_3$ and about 42 mole percent CHF$_3$. Redistillation of this fraction does not change the boiling point or composition of this material.

EXAMPLE 2

The refrigeration capacities of the true azeotrope of the invention as compared to the highest capacity component, i.e. CClF$_3$, are compared on the basis of the following refrigeration conditions:

TABLE II

| Condensing Temperature | −30°F. |
|---|---|
| Evaporating Temperature | −100°F. |

Table III compares the relative refrigeration performance of the true azeotropic of the instant invention, i.e. about 58 mole percent CClF$_3$ and about 42 mole percent CH$_3$F, as compared with the lower boiling component, CClF$_3$.

TABLE III

|  | CClF$_3$ | CClF$_3$/CH$_3$F (58 mol. %/42 mol.%) |
|---|---|---|
| Condensing Pressure (psia) | 105.6 | 132.3 |
| Evaporating Pressure (psia) | 22.23 | 28.01 |
| H.P./ton | 1.124 | 1.115 |
| C.F.M./ton | 6.744 | 5.203 |
| Relative Capacity | 100 | 130 |
| Coefficient of Performance | 4.190 | 4.223 |

I claim:

1. The process of producing refrigeration which comprises condensing a mixture consisting essentially of monochlorotrifluoromethane and methyl fluoride and possessing a boiling point lower than the boiling point of monochlorotrifluoromethane and thereafter evaporating said mixture in the vicinity of a body to be cooled.

2. The process of claim 1 wherein the boiling point of said mixture is −122.5°F. ± 1.0°F. at 14.7 psia.

3. The process of claim 1 wherein the mixture which is condensed and evaporated is an azeotrope of monochlorotrifluoromethane and methyl fluoride containing about 58 mole percent monochlorotrifluoromethane at 14.7 psia.

4. Low-boiling mixtures consisting essentially of monochlorotrifluoromethane and methyl fluoride which possess boiling points lower than the boiling point of monochlorotrifluoromethane.

5. Mixtures according to claim 4 wherein the boiling point of said mixture is −122.5°F. ± 1.0°F. at 14.7 psia.

6. Mixtures according to claim 4 wherein the boiling point of said mixture is −122.5°F. ± 0.5°F. at 14.7 psia.

7. Mixtures according to claim 4 wherein said monochlorotrifluoromethane is present in an amount of about 58 mol. percent at 14.7 psia.

* * * * *